US007108403B1

(12) United States Patent
Walters et al.

(10) Patent No.: US 7,108,403 B1
(45) Date of Patent: Sep. 19, 2006

(54) PORTABLE LIGHT EMITTING ASSEMBLY

(76) Inventors: John Walters, 28 S. Market St. Apt. 2, Mechanicsburg, PA (US) 17056; Tina R. Walters, 28 S. Market St. Apt. 2, Mechanicsburg, PA (US) 17056

( * ) Notice: Subject to any disclaimer, the term of this patent is extended or adjusted under 35 U.S.C. 154(b) by 125 days.

(21) Appl. No.: 10/822,238

(22) Filed: Apr. 12, 2004

(51) Int. Cl.
*B60Q 1/00* (2006.01)
*H01R 33/00* (2006.01)

(52) U.S. Cl. ...................... 362/368; 362/652; 362/640; 362/800

(58) Field of Classification Search ................ 362/368, 362/158, 200, 201, 190, 184, 191, 194, 196, 362/249, 800, 652, 640
See application file for complete search history.

(56) References Cited

U.S. PATENT DOCUMENTS

| | | | | |
|---|---|---|---|---|
| 392,403 A | | 3/1888 | Benensohn | |
| D304,694 S | * | 11/1989 | Goss | D10/114 |
| D354,577 S | * | 1/1995 | Cota et al. | D26/39 |
| 6,095,661 A | | 8/2000 | Lebens et al. | |
| 6,299,323 B1 | | 10/2001 | Yu et al. | |
| 6,499,859 B1 | * | 12/2002 | Petzl et al. | 362/184 |
| 6,511,203 B1 | | 1/2003 | Winther | |
| 6,663,260 B1 | * | 12/2003 | Tieszen | 362/249 |
| 6,802,635 B1 | * | 10/2004 | Robertson et al. | 362/555 |
| 6,851,827 B1 | * | 2/2005 | Clemente et al. | 362/158 |
| 2002/0067611 A1 | | 6/2002 | Yaeger | |
| 2002/0196820 A1 | | 12/2002 | Sommers et al. | |

* cited by examiner

*Primary Examiner*—Renee Luebke
*Assistant Examiner*—Evan Dzierzynski

(57) ABSTRACT

A portable light emitting assembly includes a housing having a front side, a back side and a peripheral wall extending between the front and back sides. The front side has a cavity extending therein. A panel has a first side and a second side. The panel is removably mounted in the cavity. A plurality of light emitters is attached to the second side of the panel. A first electrical conduit is mounted on the back wall and a second electrical conduit is mounted on the first side of the panel. The first electrical conduit is positioned for electrically coupling with the second electrical conduit when the panel is positioned within the cavity. The second electrical conduit is electrically coupled to the light emitters. A power supply is mounted within the housing. The power supply is electrically coupled to the first electrical conduit.

16 Claims, 4 Drawing Sheets

PORTABLE LIGHT EMITTING ASSEMBLY

BACKGROUND OF THE INVENTION

1. Field of the Invention

The present invention relates to light emitting devices and more particularly pertains to a new light emitting device for providing a signaling means and portable light source.

2. Description of the Prior Art

The use of light emitting devices is known in the prior art. U.S. Pat. No. 6,299,323 describes a flashlight that includes a light emitting diode, or LED, for providing a small amount of light. Another type of light emitting device is U.S. Patent Application No. 2002/0196620 A1 again includes a flashlight having a LED as a light source. Yet another LED flashlight device includes U.S. Pat. No. 6,095,661.

While these devices fulfill their respective, particular objectives and requirements, the need remains for a device that utilizes LEDs for both signaling the presence of a person utilizing the device but the device should be constructed so that it is easily portable on the person's clothes. Additionally, due to the nature of the use of the device, the device should include an efficient method of removing the LEDs mounted within the device so that they may be replaced if they are damaged.

SUMMARY OF THE INVENTION

The present invention meets the needs presented above by generally comprising a housing having a front side, a back side and a peripheral wall extending between the front and back sides. The front side has a cavity extending therein. A panel has a first side and a second side. The panel is removably mounted in the cavity. The panel has an outer perimeter having a size and shape substantially equal to a size and shape of an inner perimeter of the cavity. The first side may be positioned against a back wall of the cavity such that the inner perimeter of the cavity abuts the outer perimeter of the panel. A plurality of light emitters is attached to the second side of the panel. A first electrical conduit is mounted on the back wall and a second electrical conduit is mounted on the first side of the panel. The first electrical conduit is positioned for electrically coupling with the second electrical conduit when the panel is positioned within the cavity. The second electrical conduit is electrically coupled to the light emitters. A power supply is mounted within the housing. The power supply is electrically coupled to the first electrical conduit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
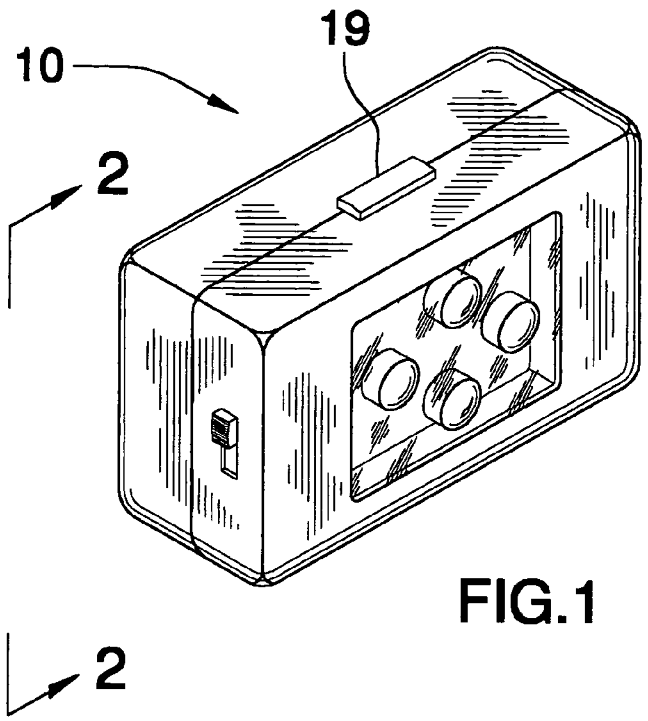
FIG. 1 is a perspective front view of a portable light emitting assembly according to the present invention.
Figure 2:
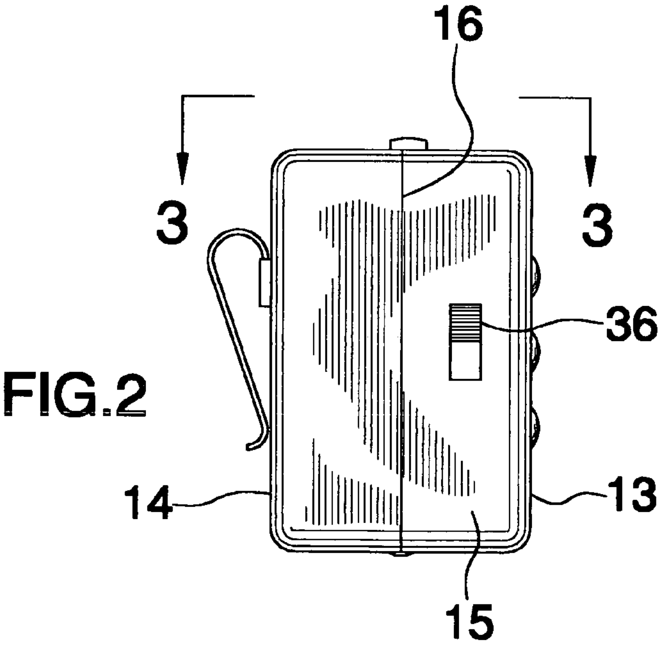
FIG. 2 is a side view of the present invention.
Figure 3:
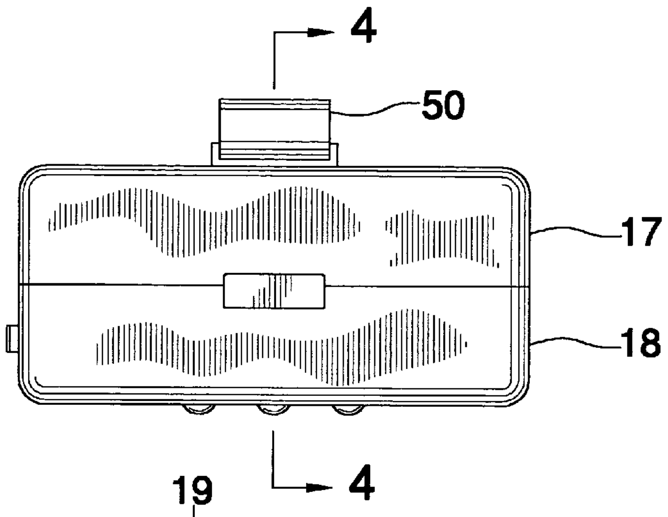
FIG. 3 is a top view of the present invention.

With reference now to the drawings, and in particular to FIGS. 1 through 6 thereof, a new light emitting device embodying the principles and concepts of the present invention and generally designated by the reference numeral 10 will be described.

Figure 5:
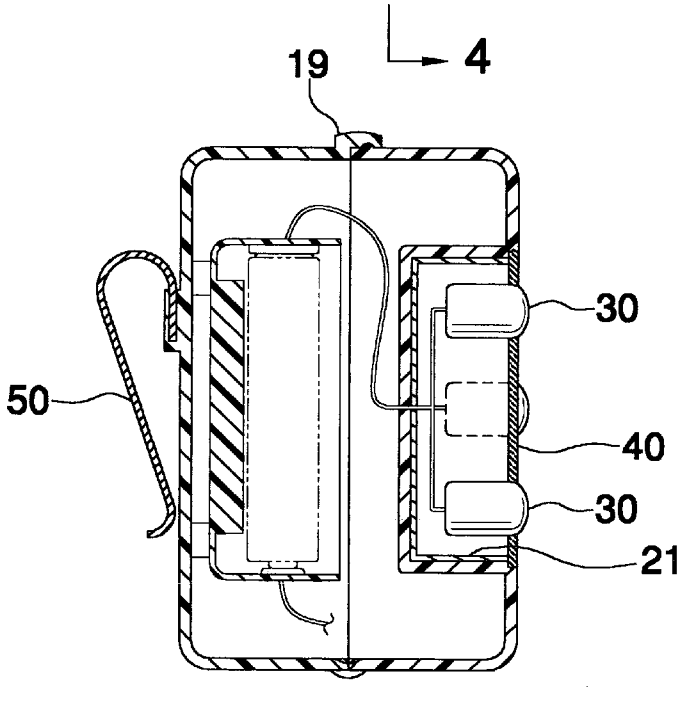
FIG. 5 is a cross-sectional view of a second embodiment of the present invention.
Figure 4:
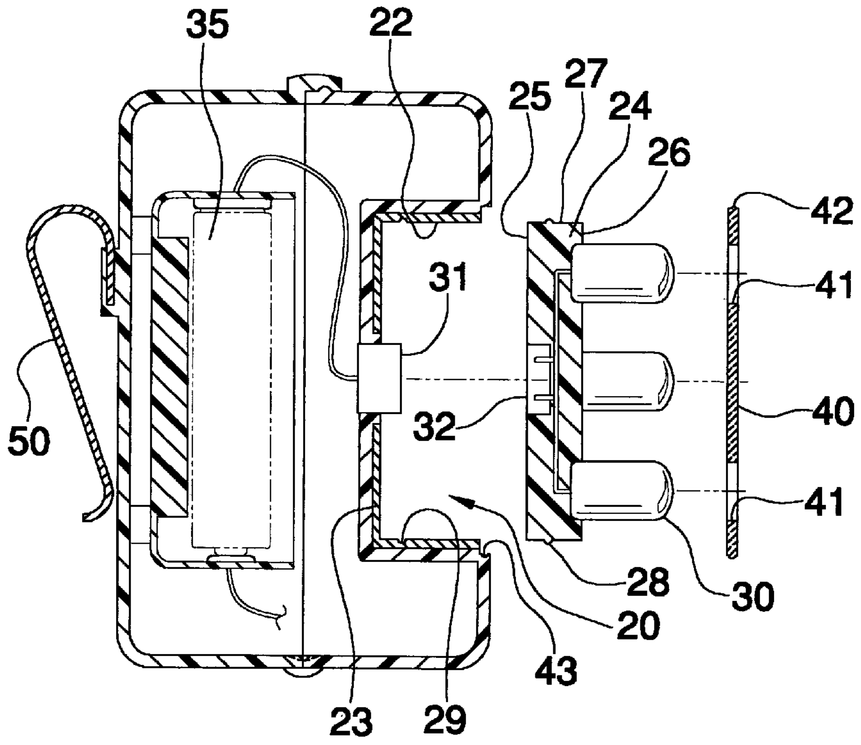
FIG. 4 is a cross-sectional view taken along line 4—4 of FIG. 3 of the present invention.
Figure 6:
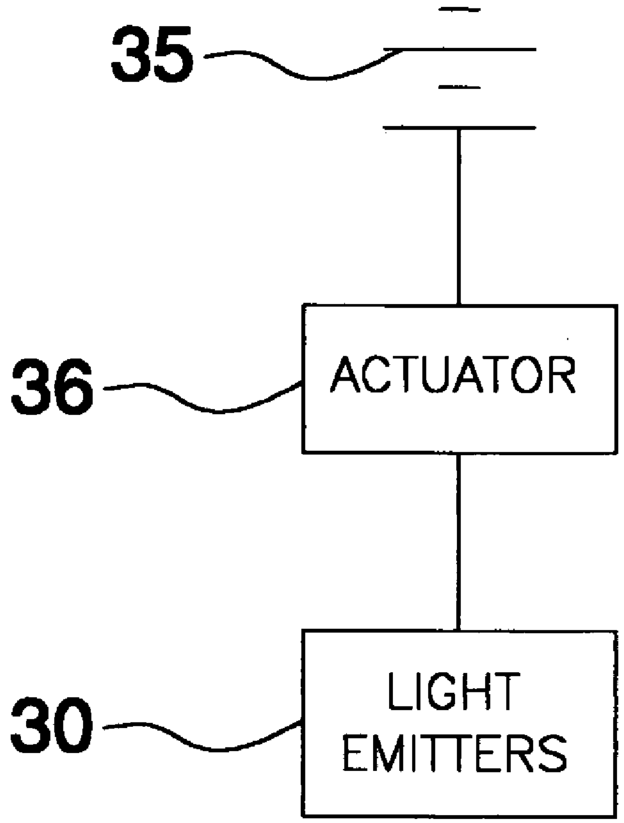
FIG. 6 is an electronic schematic view of the present invention.

As best illustrated in FIGS. 1 through 6, the portable light emitting assembly 10 generally comprises a first embodiment depicted in FIG. 4 and second embodiment depicted in FIG. 5. The first embodiment includes a housing 12 having a front side 13, a back side 14 and a peripheral wall 15 extending between the front 13 and back 14 sides. A dividing line 16 extends through the peripheral wall 15 such that a back portion 17 and a front portion 18 of the housing 12 are defined. The front 18 and back 17 portions are hingedly coupled together such that the housing 12 may be selectively positioned in an open position or a closed position. A locking member 19, such as a conventional clasp, is attached to the peripheral wall 15 for selectively locking the housing 12 in the closed position. The front side 13 has a cavity 20 extending therein. The cavity 20 is preferably coated with a reflective material 21.

A panel 24 has a first side 25 and a second side 26. The panel 24 is removably mounted in the cavity 20. The panel 25 has an outer perimeter 27 having a size and shape substantially equal to a size and shape of an inner perimeter 22 of the cavity 20. The first side 25 may be positioned against a back wall 23 of the cavity 20 such that the inner perimeter 22 of the cavity 20 abuts an outer perimeter 27 of the panel 24. A ridge 28 extending around the panel 24 may be snapped into a slot 29 in the cavity 20 for holding the panel 24 in the cavity 20. A plurality of light emitters 30 is attached to the second side 26 of the panel 24. Each of the light emitters 30 extends outwardly of the cavity 20 when the first side 25 of the panel 24 is abutting the back wall 23. Each of the light emitters 30 ideally comprises a light emitting diode. The plurality of light emitters 30 preferably includes four light emitters 30 that are positioned in a diamond pattern. A first electrical conduit 31 is mounted on the back wall 23 and a second electrical conduit 32 is mounted on the first side 25 of the panel 24. The first electrical conduit 31 is positioned for electrically coupling with the second electrical conduit 32 when the panel 24 is positioned within the cavity 20. The second electrical conduit 32 is electrically coupled to the light emitters 30. The panel 24 allows the light emitters 30 may be removed in case of breakage. The positioning of the light emitters 30 spreads light over an area and provides a marker for determining if a person using the assembly 10 is moving toward an onlooker.

A power supply 35 is mounted within the housing 12. The power supply 35 is electrically coupled to the first electrical conduit 31. The power supply 35 preferably comprises a battery that is removably mounted within the back portion 17 of the housing 12. The battery, or power supply 35, may be removed and replaced when by opening the housing 12. An actuator 36 is electrically coupled to the power supply 35 for selectively turning the light emitters 30 on or off.

A substantially transparent window 40 is removably attached on the front side 13 such that the window 40 covers the cavity 20. The window 40 has a plurality of openings 41 extending therethrough. Each of the openings 41 is positioned for receiving one of the light emitters 30. The window 40 preferably includes a peripheral flange 42 that is removably positionable into a peripheral notch 43 for releasably securing window 40 to the housing 12.

A clip member 50 is attached to the back side 14 for selectively attaching the housing 12 to an article of clothing. The clip member 50 may be used to attach the housing 12 to a belt, upper edge of pants or shorts, or to an edge of a pocket.

The second embodiment does not include the panel 24 but instead provides for light emitters 30 mounted in the cavity 20. The power supply 35 is directly coupled to the light emitters 30. The remaining components of the second embodiment are substantially identical to the components of the first embodiment.

In use, the assembly 10 is used for providing a light source and for signaling the presence of persons wearing the assembly. The clip 50 makes the device convenient for outdoor activities such as walking a pet, jogging and the like. By including a plurality of LED light emitters, the assembly is reliable while also providing a sufficient amount of light to illuminate an object in close proximity to the housing.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A light providing assembly comprising:

a housing having a front side, a back side and a peripheral wall extending between said front and back sides, an interior of said housing being defined between said front and back walls, said front side having an outer surface positioned opposite of said interior having a cavity extending therein;

a panel having a first side and a second side, said panel being removably mounted in said cavity, said panel having an outer perimeter having a size and shape substantially equal to a size and shape of an inner perimeter of said cavity, wherein said first side may be positioned against a back wall of said cavity such that said inner perimeter of said cavity abuts said outer perimeter of said panel;

a plurality of light emitters being attached to said second side of said panel;

a first electrical conduit being mounted on said back wall, a second electrical conduit being mounted on said first side of said panel, said first electrical conduit being positioned for electrically coupling with said second electrical conduit when said panel is positioned within said cavity, said second electrical conduit being electrically coupled to said light emitters; and a power supply being mounted within said housing, said power supply being electrically coupled to said first electrical conduit.

2. The assembly according to claim 1, wherein further including a dividing line extending through said peripheral wall such that a back portion and a front portion of said housing is defined, said front and back portions being hingedly coupled together such that said housing may be selectively positioned in an open position or a closed position, a locking member being attached to said peripheral wall for selectively locking said housing in said closed position.

3. The assembly according to claim 2, wherein said power comprises a battery removably mounted within said back portion of said housing.

4. The assembly according to claim 3, further including an actuator being electrically coupled to said power supply for selectively turning said light emitters on or off.

5. The assembly according to claim 1, wherein each of said light emitters extends outwardly of said cavity when said first side of said panel is abutting said back wall.

6. The assembly according to claim 5, wherein each of said light emitters comprises a light emitting diode.

7. The assembly according to claim 6, wherein said plurality of light emitters includes four light emitters positioned in a diamond pattern.

8. The assembly according to claim 6, further including a clip member being attached to said back side for selectively attaching said housing to an article of clothing.

9. The assembly according to claim 6, further including a substantially transparent window being removably attached on said front side such that said window covers said cavity, said window having a plurality of openings extending therethrough, each of said openings being positioned for receiving one of said light emitters, each of said light emitter extending through and outwardly from said window.

10. The assembly according to claim 9, further including a clip member being attached to said back side for selectively attaching said housing to an article of clothing.

11. The assembly according to claim 1, further including an actuator being electrically coupled to said power supply for selectively turning said light emitters on or off.

12. The assembly according to claim 1, further including a substantially transparent window being removably attached to said front side such that said window covers said cavity.

13. The assembly according to claim 1, further including a clip member being attached to said back side for selectively attaching said housing to an article of clothing.

14. A light providing assembly comprising:

a housing having a front side, a back side and a peripheral wall extending between said front and back sides, a dividing line extending through said peripheral wall such that a back portion and a front portion of said housing is defined, said front and back portions being hingedly coupled together such that said housing may be selectively positioned in an open position or a closed position, a locking member being attached to said peripheral wall for selectively locking said housing in said closed position, said front side having a cavity extending therein;

a panel having a first side and a second side, said panel being removably mounted in said cavity, said panel having an outer perimeter having a size and shape substantially equal to a size and shape of an inner perimeter of said cavity, wherein said first side may be positioned against a back wall of said cavity such that said inner perimeter of said cavity abuts said outer perimeter of said panel;

a plurality of light emitters being attached to said second side of said panel, each of said light emitters extending outwardly of said cavity when said first side of said panel is abutting said back wall, each of said light emitters comprising a light emitting diode, said plurality of light emitters including four light emitters positioned in a diamond pattern;

a first electrical conduit being mounted on said back wall, a second electrical conduit being mounted on said first side of said panel, said first electrical conduit being positioned for electrically coupling with said second electrical conduit when said panel is positioned within said cavity, said second electrical conduit being electrically coupled to said light emitters;

a power supply being mounted within said housing, said power supply being electrically coupled to said first electrical conduit, said power supply comprising a battery removably mounted within said back portion of said housing;

an actuator being electrically coupled to said power supply for selectively turning said light emitters on or off;

a substantially transparent window being removably attached on said front side such that said window covers said cavity, said window having a plurality of openings extending therethrough, each of said openings being positioned for receiving one of said light emitters; and a clip member being attached to said back side for selectively attaching said housing to an article of clothing.

15. A light providing assembly comprising:

a housing having a front side, a back side and a peripheral wall extending between said front and back sides, said front side having an outer surface having a cavity extending therein, a dividing line extends through said peripheral wall such that a back portion and a front portion of said housing is defined, said front and back portions being hingedly coupled together such that said housing may be selectively positioned in an open position or a closed position, a locking member being attached to said peripheral wall for selectively locking said housing in said closed position, said front side having a cavity extending therein said power supply comprising a battery removably mounted thin said back portion of said housing;

a plurality of light emitters being mounted in the cavity such that said light emitters extend away from a back wall of said cavity;

a power supply being mounted within said housing, said power supply being electrically coupled to said light emitters;

an actuator being electrically coupled to said power supply for selectively turning said light emitters on or off;

a substantially transparent window being removably attached on said front side such that said window covers said cavity, said window having a plurality of openings extending therethrough, each of said openings being positioned for receiving one of said light emitters; and a clip member being attached to said back side for selectively attaching said housing to an article of clothing.

16. The assembly of claim 15, wherein each of said light emitters extends outwardly of said cavity, each of said light emitters comprising a light emitting diode, said window having a plurality of openings extending therethrough, each of said openings being positioned for receiving one of said light emitters.

* * * * *